United States Patent
Cunningham

[15] 3,671,707
[45] June 20, 1972

[54] UNDERWATER WELDING DEVICE

[72] Inventor: William G. Cunningham, 315 Buquet Street, Houma, La. 70360

[22] Filed: March 16, 1971

[21] Appl. No.: 124,868

[52] U.S. Cl. ............................................................. 219/74
[51] Int. Cl. .......................................................... B23k 9/16
[58] Field of Search ....................... 219/72, 74, 130, 137, 75

[56] References Cited

UNITED STATES PATENTS

| 1,749,765 | 3/1930 | Hendrickson | 219/74 |
|---|---|---|---|
| 1,711,151 | 4/1929 | Lincoln | 219/74 |
| 3,521,022 | 7/1970 | Sato | 219/72 |
| 3,581,042 | 5/1971 | Pilia | 219/72 x |

Primary Examiner—C. L. Albritton
Attorney—Clarence A. O'Brien and Harvey B. Jacobson

[57] ABSTRACT

An elongated viewing tube tapering from an enlarged viewing window mounting end to a narrower nozzle connected end. The nozzle includes a straight passage therethrough which defines a continuation of the viewing tube, and a branch passage which receives the electrode. Inert gas is introduced into the viewing tube adjacent the viewing window and moves through the viewing tube so as to meet with the gas from the torch tip at the weld puddle at which point the water is blown out of the end of the device so as to provide a clear view of the welding operation. An internal light is provided within the viewing tube and the outer end of the nozzle includes a flexible skirt which assists in excluding water.

9 Claims, 3 Drawing Figures

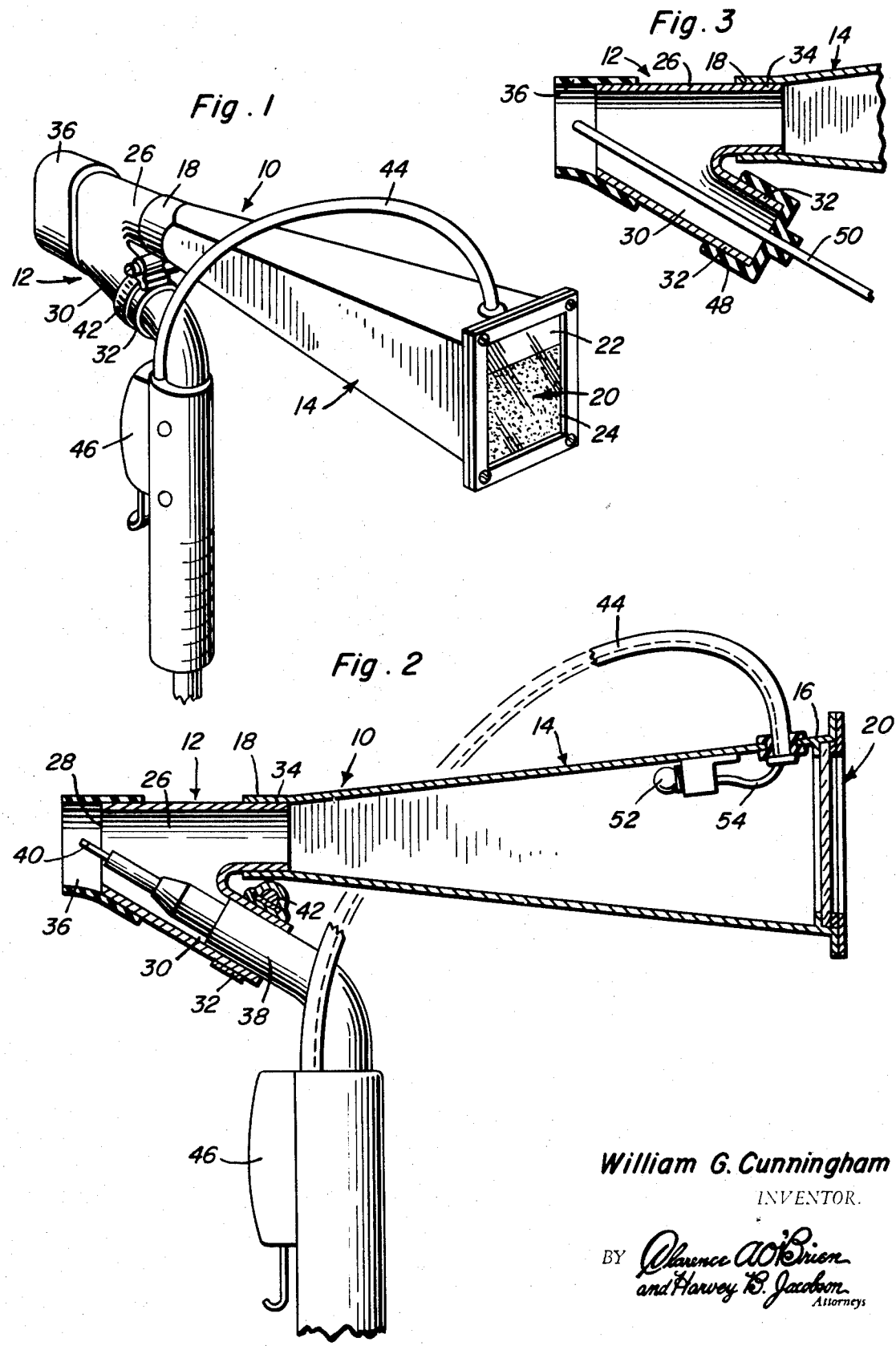

UNDERWATER WELDING DEVICE

The invention herein generally relates to gas metal arc welding, such being an electric welding process in which a consumable bare electrode is fed into a weld zone at a controlled rate while a continuous blanket of inert gas shields the weld zone from contamination.

More particularly, the invention herein is concerned with the provision of a device which enables the utilization of a gas metal arc welding process underwater.

The desirability of using a gas metal arc welding process underwater arises from the fact that this process is accepted as the most efficient in normal welding procedures. However, upon initial experimentation with this process underwater, it was found that the inert gas used in the process formed a bubble over the welding site. The bubble in turn produced a mirror effect which completely surrounded the welding site, making a view thereof impossible. Accordingly, the instant invention was devised which eliminates the bubble, removes the water from the actual welding site and provides a clear view thereof.

More particularly, the instant invention provides a device which mounts a torch contact tip and electrode for exposure through a rubber skirt surrounded nozzle end, the nozzle end being viewed directly through a longitudinally extending sealed viewing tube through which a supply of inert gas is directed so as to combine with the gas from the torch tip and expel the water from the viewing tube and weld area. The unit is adapted to accommodate any conventional weld equipment and is compact, easy to handle and provides a direct although protected view of the welding operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIG. 1 is a perspective view of the welding equipment of the instant invention;

FIG. 2 is an enlarged longitudinal cross-sectional view therethrough; and

FIG. 3 is a cross-sectional view through the nozzle accommodating a coated electrode for fluxed rod welding.

Referring now more specifically to the drawings, reference numeral 10 is used to generally designate the device comprising the instant invention. Structurally, this device 10 comprises basically a nozzle 12 and an elongated viewing tube 14.

The viewing tube 14 is rectangular in cross-section and tapers continuously from a first enlarged view window mounting end 16 to a second cylindrically formed nozzle mounting end 18. The view window incorporates a replaceable viewing glass 20 including a relatively small clear glass area 22 for a clear viewing of the welding site when the actual welding is not in process, and a relatively larger area of reflector welding glass 24. The viewing glass 20 is to be replaceable as desired and, when mounted, sealed in a water tight manner to the tube 14 which in itself is of water tight construction. FIGS. 1 and 2 clearly illustrate one manner of providing for a removable mounting of the glass 20.

The nozzle 12, also of water tight construction, includes a straight passage forming portion 26 therethrough which longitudinally alignes with the viewing tube 14 and terminates in a base end 28. The nozzle 12 also includes a branch passage forming portion 30 which joins the first passage forming portion 26 at and inward of the base end 28 of the nozzle and flares outwardly and at an angle thereto to define a projecting torch mounting end section 32 angularly spaced from the nozzle end section 34 which is received in a water tight manner within the cylindrical viewing tube end 18. The base end 28 of the nozzle 12 is surrounded with a flexible outwardly projecting rubber skirt 36.

The torch mounting end section 32 of the nozzle branch 30 telescopically receives the torch head 38, enclosing the torch contact tip with the consumable bare electrode 40 orientated through the base end 28 of the nozzle 12 for engagement with the work area. The torch head 28 is sealed within the branch end section 32 by the utilization of a section surrounding clamp 42 to exert a slight compressive force on the end section, providing a general seal therebetween which, in conjunction with the internal gas pressure generated, is sufficient so as to exclude the entrance of water. Incidently, it will of course be appreciated that the torch, leads and control box will have to be appropriately waterproof for use underwater.

In addition to the introduction of the inert gas directly at the welding site so as to provide the continuous blanket or shield above the weld zone, a separate gas flow line 44 extends from the torch into communication with the interior of the viewing tube 14 immediately adjacent the enlarged viewing window mounting end 16 thereof. Flow through this tube 44 is controlled by a suitable trigger valve 46 mounted directly on the torch. The end of the gas flow tube 44 communicated with the viewing tube 14 is of course appropriately sealed thereto in a water tight manner. Further, the discharging end of the gas tube 44 is so angled that the incoming gas strikes against the inner surface of the viewing window 20, thus keeping it free of water particles, discoloration caused by welding emissions, and welding splatter. The substantially elongated nature of the viewing tube 14 also contributes to the protection of the viewing glass 20 while at the same time not interferring with a clear view of the welding area due to the straight line orientation of the viewing tube directly from the viewing glass 20 to the base end 28 of the nozzle 12. The tapered nature of the viewing tube 14 concentrates the line of sight from the easily accessible enlarged viewing window.

In use, immediately prior to commencing of the welding at the underwater site, the interior of the device is purged of water with the inert gas. This is effected by introducing gas into the viewing tube 14 through the gas tube 44, which gas moves through the viewing tube 14, meeting the gas introduced at the torch tip and combining therewith in effectively expelling the gas through the base end of the nozzle 28 and the surrounding flexible skirt 36. This skirt 36, which will be engaged against the material surrounding the weld area, assists the introduced gas in retaining the water outward of the welding area during the welding operation whereby a clear view thereof is possible so as to enable a proper control of the weld puddle and the production of a uniform weld.

With reference to FIG. 3, it will be noted that the nozzle 12 is also particularly adapted to enable fluxed rod welding. This is effected by utilizing a rubber cap 48 over the torch mounting end section 32. This cap includes a central aperture which frictionally, and in a water excluding manner, receives the coated electrode 50 therethrough. When welding underwater in this manner, compressed air may be substituted for the inert gas and likewise introduced through the viewing window end 16 of the elongated viewing tube 14 so as to maintain the viewing tube, nozzle and weld site free of water.

With reference to FIG. 2, the device of the instant invention is unique in its adaptability for use in underwater welding by the further incorporation therein of an internal light 52 provided within the viewing tube 14 immediately inward of the viewing glass window 20. This light 52 is particularly desirable in that most underwater welding will necessarily have to be done in total or near darkness due to water depth or discoloration. The provision of the light 52 permits a complete viewing of the weld zone prior to a striking of the arc. For purposes of convenience, the conductor wires 54 for the light 52 are run through the gas tube 44 back to the torch and to an appropriate source of power, normally within the torch system itself.

From the foregoing, it will be appreciated that a highly unique device has been defined. This device, while structurally simple, is particularly adapted for enabling underwater gas metal arc welding, an electric welding process heretofore not practically possible in underwater operations. This has been effected by the provision of means whereby a purging of the underwater weld site of water is effected and provision made for a clear viewing of the weld operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follow

1. In an underwater welding device, an elongated viewing tube, a nozzle at one end of said viewing tube, said nozzle having an open base end, a viewing window at the second end of said viewing tube, means for positioning welding equipment within said nozzle with an electrode exposed through the open base end, and means for purging the interior of the viewing tube and nozzle of water, said viewing tube and nozzle defining a straight viewing passage from the viewing window to the electrode accommodating base end, an angularly directed branch passage forming portion on said nozzle, said branch passage forming portion accommodating and enabling a mounting of welding equipment laterally of the defined straight view passage, the means for purging the interior of the viewing tube and nozzle of water comprising a gas tube communicated with the viewing tube adjacent the second end thereof, said gas tube extending therefrom to a gas supply.

2. The device of claim 1 wherein the water is purged utilizing an inert gas introduced both through the gas tube and the equipment accommodating branch passage forming portion.

3. The device of claim 2 including a light mounted within said viewing tube for illuminating the weld site at the base end of the nozzle.

4. The device of claim 3 wherein said viewing tube is longitudinally tapered from a greater cross-sectional area at the second end thereof to a lesser cross-sectional area at the first end thereof.

5. The device of claim 4 including a flexible water excluding skirt surrounding the base end of the nozzle.

6. The device of claim 3 including conductor wires for said light, said conductor wires extending through said gas tube for a communication with the light interiorly within said viewing tube.

7. The device of claim 1 including a light mounted within said viewing tube for illuminating the weld site at the base end of the nozzle, and conductor wires connected to said light for the supplying of power thereto, said conductor wires extending through said gas tube.

8. In an underwater welding device, an elongated viewing tube, a nozzle at one end of said viewing tube, said nozzle having an open base end, a viewing window at the second end of said viewing tube, means for positioning welding equipment within said nozzle with an electrode exposed through the open base end, and means for purging the interior of the viewing tube and nozzle of water, said viewing tube and nozzle defining a straight viewing passage from the viewing window to the electrode accommodating base end, the means for purging the interior of the viewing tube and nozzle of water comprising a gas tube communicated with the viewing tube adjacent the second end thereof, said gas tube extending therefrom to a gas supply.

9. The device of claim 8 including a light mounted within said viewing tube for illuminating the weld site at the base end of the nozzle, and conductor wires connected to said light for the supplying of power thereto, said conductor wires extending through said gas tube.

* * * * *

Notice of Adverse Decision in Interference

In Interference No. 98,222 involving Patent No. 3,671,707, W. G. Cunningham, UNDERWATER WELDING DEVICE, final judgment adverse to the patentee was rendered Mar. 20, 1974, as to claims 1, 2, 3, 6, 7, 8 and 9.

[*Official Gazette July 2, 1974.*]